United States Patent [19]

Tanaka

[11] 4,419,702

[45] Dec. 6, 1983

[54] AUTO-REVERSE DEVICE FOR A TWO-REEL TYPE TAPE RECORDER

[75] Inventor: Shinsaku Tanaka, Tokyo, Japan

[73] Assignee: Tanashin Denki Co., Ltd., Tokyo, Japan

[21] Appl. No.: 268,097

[22] Filed: May 27, 1981

[30] Foreign Application Priority Data

Jun. 20, 1980 [JP] Japan ................................. 55-83703
Oct. 14, 1980 [JP] Japan ................................. 55-142396
Oct. 14, 1980 [JP] Japan ................................. 55-142397
Oct. 14, 1980 [JP] Japan ................................. 55-142398

[51] Int. Cl.³ ....................... G11B 15/06; G11B 15/26
[52] U.S. Cl. ................................. 360/96.4; 360/74.1; 360/105
[58] Field of Search ............... 360/74.1, 74.2, 96.1, 360/96.4, 105; 242/200, 201, 206

[56] References Cited

U.S. PATENT DOCUMENTS 4,159,492  6/1979  Ban et al. ........................ 360/74.1

Primary Examiner—Joseph A. Popek
Attorney, Agent, or Firm—Frishauf, Holtz, Goodman & Woodward

[57] ABSTRACT

When the rotating direction of a driving rotator driven by a motor is changed in synchronism with a change of the rotating direction of the motor, a rocking member coaxial with the driving rotator rocks to cause an intermediate rotator supported by the rocking member to leave one working rotator on one reel shaft side and to engage the other working rotator on the other reel shaft side, thereby transmitting the turning force of the driving rotator to the other reel shaft. The rocking member shifts a transmission mechanism to a position where the transmission mechanism is allowed to engage the driving rotator as the rocking member rocks, and then the turning force of the driving rotator is transmitted to a pinch roller shift mechanism through the transmission mechanism. When the pinch roller shift mechanism is actuated, two pinch rollers shift their positions relative to their corresponding capstans, thereby changing the direction of magnetic tape feed.

6 Claims, 18 Drawing Figures

FIG. 7
FIG. 8
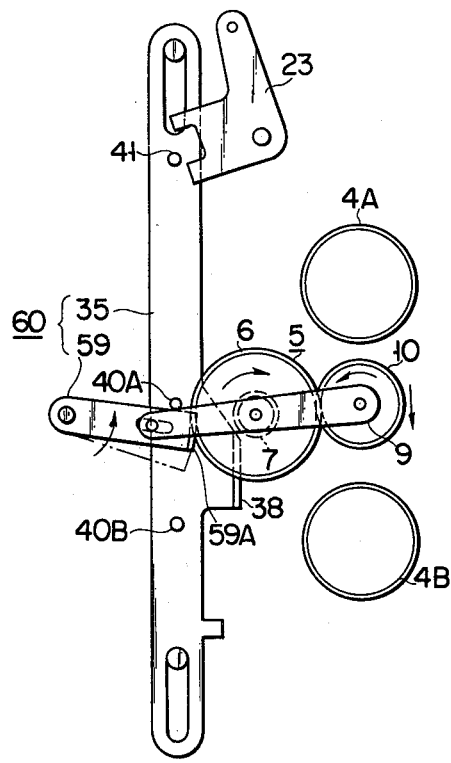
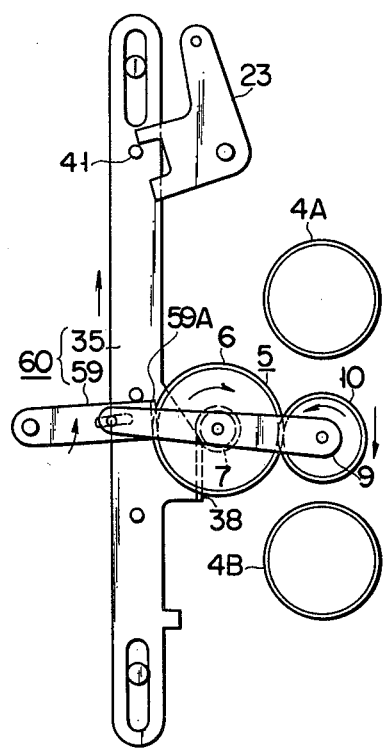

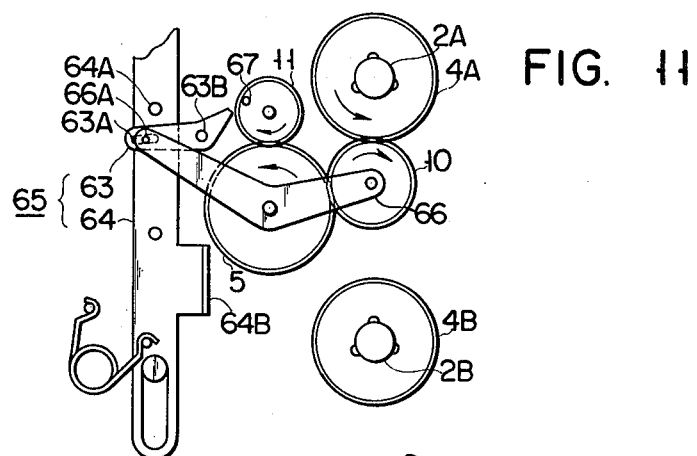
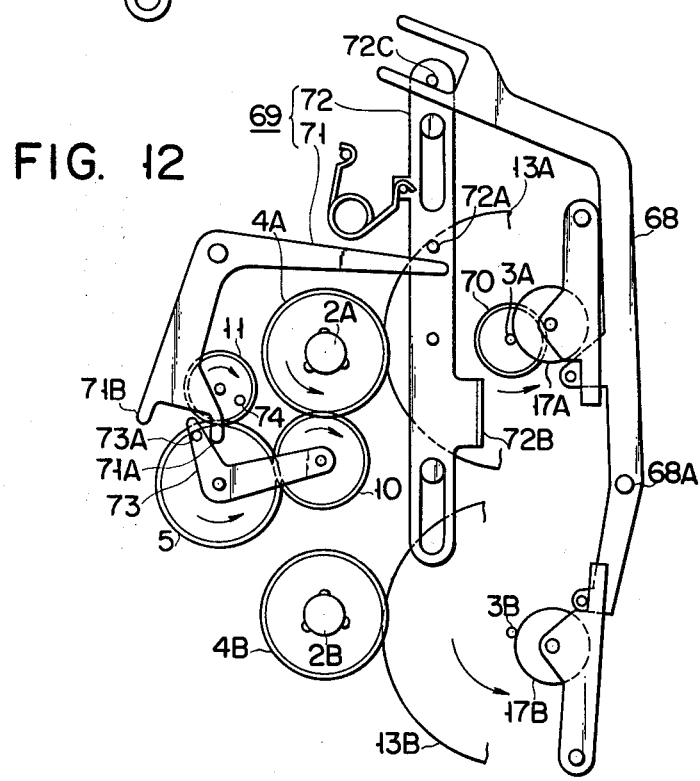

AUTO-REVERSE DEVICE FOR A TWO-REEL TYPE TAPE RECORDER

BACKGROUND OF THE INVENTION

This invention relates to an auto-reverse device for a two-reel type tape recorder capable of shifting the positions of a pair of pinch rollers relative to their corresponding capstans without using any special driving source, and which is simple in construction.

Conventionally, many auto-reverse devices are so designed that the positions of a pair of pinch rollers relative to their corresponding capstans are shifted by means of a plunger. The plunger need, however, be strong enough to separate the pinch rollers from their corresponding capstans against the urging force to press the former against the latter, which constitutes a hindrance to the miniaturization of a tape recorder as a whole. Further, the plunger need be so large in size that the drive of the plunger requires too high power. Moreover, a shift mechanism for driving a pair of reel shafts to rotate in an alternative way is too complicated in construction to avoid an increase of the overall dimensions of the tape recorder.

In starting a playback or recording operation immediately after a magnetic tape is quickly fed in the leftward or rightward direction to be wound or rewound to its end, three operations need be performed in the order of fast forward mode, stop mode, and playback or recording mode, or two operations need be performed in the order of fast forward mode and playback or recording mode even where the tape recorder is provided with an automatic shut-off, conventionally.

Accordingly, an object of this invention is to provide an auto-reverse device for a two-reel type tape recorder simplified in construction and miniaturized in such a manner that a change of the rotating direction of a motor for driving capstans is mechanically detected to shift the transmission path of the turning force of the motor from one reel shaft side to the other and also to shift the positions of a pair of pinch rollers relative to their corresponding capstans by means of the turning force of the motor.

Another object of the invention is to improve the operating efficiency of a tape recorder by using a single action in starting a playback or recording operation immediately after a magnetic tape is quickly fed in the leftward or rightward direction to be wound or rewound to its end.

SUMMARY OF THE INVENTION

According to the invention, there is provided an auto-reverse device for a two-reel type tape recorder which comprises a pair of reel shafts each provided with a working rotator to rotate together therewith, a magnetic head, a pair of capstans disposed on both sides of the magnetic head respectively, a pair of pinch rollers disposed correspondingly to the capstans and alternately pressed against their corresponding capstans, a reversible motor for driving the capstans to rotate, a pinch roller shift mechanism for shifting the positions of the pinch rollers relative to the capstans in synchronism with a change of the rotating direction of the motor, a driving rotator driven by the motor, an intermediate rotator engaging the driving rotator and engaging one of the working rotators in an alternative way to transmit the turning force of the driving rotator to the working rotator, a rocking member mounted coaxially with the driving rotator, urged in the same direction as the rotating direction of the driving rotator by the turning force of the driving rotator, and rocking in synchronism with the change of the rotating direction of the motor, thereby separating the intermediate rotator from the one working rotator and causing the intermediate rotator to engage the other working rotator, and a transmission mechanism normally disengaged from the driving rotator and being movable to a position to engage the driving rotator by the rocking force of the rocking member to transmit the turning force of the driving rotator to the pinch roller shift mechanism, thereby actuating the pinch roller shift mechanism to shift the positions of the pinch rollers relative to their corresponding capstans.

According to the invention, moreover, there is provided an auto-reverse device for a two-reel type tape recorder in which a fast forward control member is automatically restored to an original state by the transmission mechanism when the fast forward control member is held in its retreated position.

This invention can be more fully understood from the following detailed description when taken in conjunction with the accompanying drawings.

BRIEF DESCRIPTION OF THE DRAWINGS

FIGS. 1 to 6 show an embodiment of this invention, in which:

FIG. 1 is a general plan view;

FIGS. 2 to 5 are partial plan views; and

FIG. 6 is a partial perspective view.

FIGS. 7 and 8 are partial plan views showing another embodiment of the invention;

FIGS. 9 to 13 are partial plan views severally showing alternative embodiments of the invention;

FIGS. 14 to 16 show a further embodiment of the invention, in which:

FIG. 14 is a general plan view; and

FIGS. 15 and 16 are partial plan views;

FIGS. 17 and 18 are partial plan views severally showing additional embodiments of the invention.

DETAILED DESCRIPTION

Figure 1:
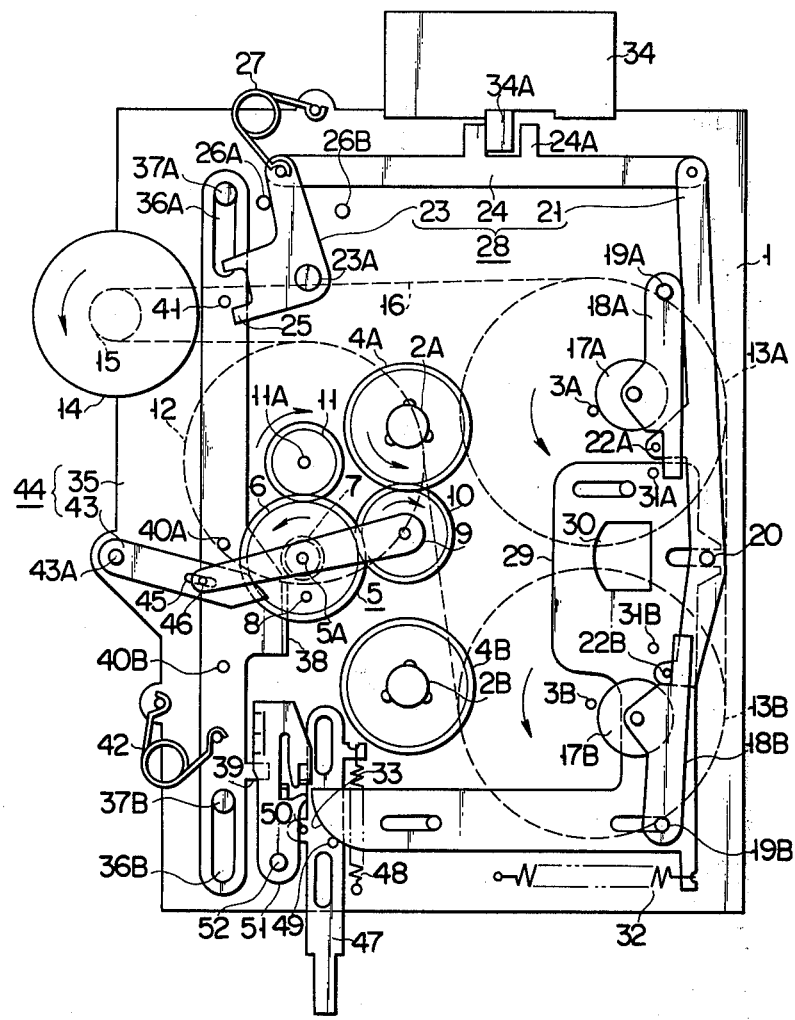

First, there will be described an embodiment shown in FIGS. 1 to 6. FIG. 1 shows the mechanical part of a tape recorder with an auto-reverse device in which a pair of reel shafts 2A and 2B and a pair of capstans 3A and 3B are rotatably mounted on the top side of a base plate 1. The reel shafts 2A and 2B are provided respectively with working gears 4A and 4B as working rotators in the lower positions which rotate together by means of e.g. a friction transmitting mechanism. On the top of the base plate 1, moreover, a driving rotator 5 is rotatably set in a position at equal distances from the working gears 4A and 4B. The driving rotator 5 is formed of large and small driving gears 6 and 7 in a united body. These two driving gears are mounted on a single shaft 5A with the large gear 6 on the upper side. An engaging pin 8 protrudes from the top of the large gear 6, the central part of a rocking member 9 is rockably mounted on the upper end portion of the shaft 5A, and an intermediate gear 10 as an intermediate rotator is rotatably attached to one end side of the rocking member 9. The intermediate gear 10 always engages the large-diameter driving gear 6. The rocking member 9 is urged in the same direction as the rotating direction of the driving gear 6 by the turning force of the driving gear 6, thereby causing the intermediate gear 10 to engage either the working gear 4A or 4B. A transmission gear 11 is rotatably mounted on the base plate 1. The transmission gear 11 engages the large-diameter driving gear 6, having its shaft 11A projected on the back side of the base plate 1 so that a pulley 12 is attached to the projected end of the shaft 11A.

Figure 4:
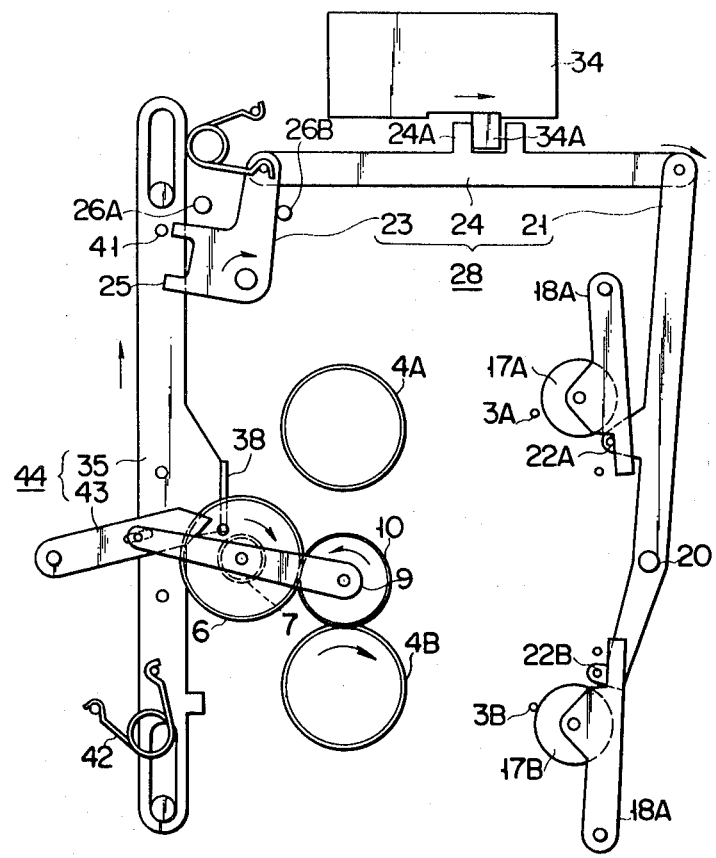

Flywheels 13A and 13B are attached respectively to the lower ends of the capstans 3A and 3B on the back side of the base plate 1. Numeral 14 designates a reversible motor for driving the capstans 3A and 3B to rotate. An endless belt 6 is stretched between a motor pulley 15 mounted on the shaft of the motor 14, the flywheels 13A and 13B, and the pulley 12. Thus, the capstans 3A and 3B are rotated in the same direction as the motor 14, while the transmission gear 11 is rotated in the opposite direction to the rotating direction of the motor 14. Further, the driving rotator 5 engaging the transmission gear 11 is driven to rotate in the same direction as the motor 14. Numerals 17a and 17B designate pinch rollers which correspond to the capstans 3A and 3B, respectively. Pinch arms 18A and 18B bearing these pinch rollers 17A and 17B are swingably mounted on the base plate 1 by means of pivots 19A and 19B. The pinch arms 18A and 18B are urged by a spring (not shown) to rock in such directions that the pinch rollers 17A and 17B are pressed against the capstans 3A and 3B, respectively. Moreover, a shift lever 21 is rockably mounted on the top of the base plate 1 by means of a pivot 20 which is located at equal distances from the two capstans 3A and 3B. The shift lever 21 has pressure pins 22A and 22B located respectively in the vicinities of the rocking ends of the pinch arms 18A and 18B. When the shift lever 21 rocks in the clockwise direction of FIG. 1 around the pivot 20, the pinch arm 18A is pressed against the urging force by the pressure pin 22A to separate the pinch roller 17A from the capstan 3A. When the shift lever 21 rocks in the counterclockwise direction, on the other hand, the pinch arm 18B is pressed against the urging force by the pressure pin 22B to separate the pinch roller 17B from the capstan 3B. An L-shaped rocking lever 23 is rockably mounted on another portion of the base plate 1 by means of a pivot 23A, one end of the rocking lever 23 being coupled to one end of the shift lever 21 by means of a coupling lever 24. A forked engaging portion 25 is formed at the other end of the rocking lever 23. Numerals 26A and 26B designate stoppers for regulating the rocking range of the rocking lever 23. The rocking lever 23 is stably maintained by a toggle spring 27 in such a position that it abuts on the stopper 26A or 26B. The shift lever 21, rocking lever 23, and coupling lever 24 constitute a pinch roller shift mechanism 28. When the rocking lever 23 is on the one stopper 26A side as shown in FIG. 1, the pinch roller 17A is pressed against the capstan 3A. When the rocking lever 23 rocks to the other stopper 26B side as shown in FIG. 4, the one pinch roller 17A is separated from the capstan 3A by the pressure pin 22A of the shift lever 21, while the other pinch roller 17B is pressed against the capstan 3B. The coupling lever 24 is provided with a switch operating portion 24A.

Numeral 29 denotes a substantially L-shaped head mounting plate slidably set on the base plate 1. On the top of the mounting plate 29, a magnetic head 30 is mounted in a position at equal distances from the two capstans 3A and 3B. Guided by the pivots 19B and 20, etc., the mounting plate 29 can slide from side to side as in FIG. 1. On the top of the mounting plate 29, moreover, pressure pins 31A and 31B are located in the vicinities of the pinch arms 18A and 18B, respectively. When the mounting plate 29 moves to the right of FIG. 1, these pressure pins 31A and 31B press the rocking ends of the pinch arms 18A and 18B against the urging force to keep the pinch rollers 17A and 17B apart from the capstans 3A and 3B. Stretched between the head mounting plate 29 and the base plate 1 is a tension spring 32 whereby the mounting plate 29 is always urged to the left of FIG. 1. An arcuate cam surface 33 is formed at one end of the mounting plate 29.

Numeral 34 designates a polarity inversion switch for changing the polarity of the head terminal of the magnetic head 30. A shift button 34A of the switch 34 engages the switch operating portion 24A of the coupling lever 24 to shift the switch on shifting of the positional relationships between the pinch rollers 17A and 17B and the capstans 3A and 3B.

Mounted on the top of the base plate 1 is a plate-like transmission member 35 which is elongated along the vertical direction of FIG. 1. The transmission member 35 has slots 36A and 36B at both ends thereof in which guide pins 37A and 37B are fitted so that the transmission member 35 may slide along its longitudinal direction within the range of the slots 36A and 36B. The transmission member 35 further has a rack 38 and a projection 39 on one lateral side and a pair of engaging pins 40A and 40B and an operating pin 41 on the top. The transmission member 35 may have its rack 38 engaging the small gear 7 of the driving rotator 5 as required, but is normally stably maintained by a toggle spring 42 in the uppermost position (FIG. 1) or the lowermost position (FIG. 4) where it is not in gear with the driving rotator 5.

Numeral 43 designates an engaging member which constitutes a transmission mechanism 44 in cooperation with the transmission member 35. One end of the engaging member 43 is rockably mounted on the top of the base plate 1 by means of a pivot 43A. The engaging member 43 has a slot 45 in which an engaging pin 46 attached to the rocking member 9 is fitted so that the engaging member 43 may interlock with the rocking member 9. The rocking end of the engaging member 43 extends to the top side of the driving rotator 5 (top side of the large gear 6) through the space between the engaging pins 40A and 40B on the transmission member 35 so that the engaging member 43 may move onto the revolution orbit of the pin 8 as the rocking member 9 is rocked.

Figure 6:
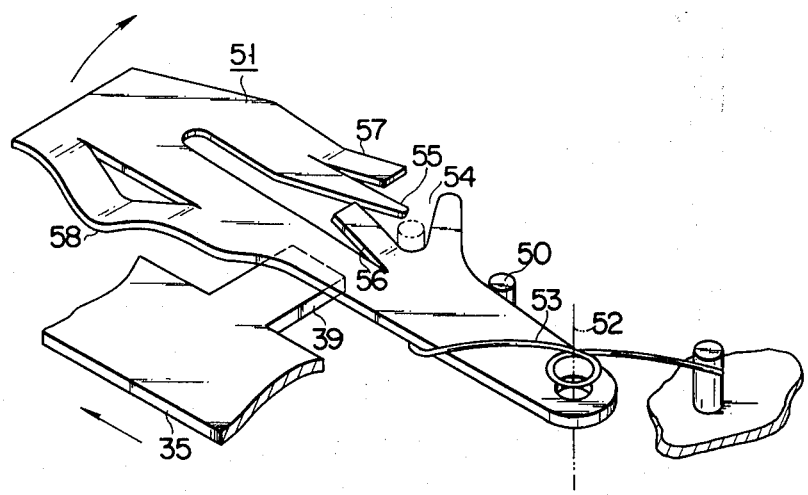

Numeral 47 designates a fast forward control lever which is mounted on the top of the base plate 1 so as to be able to slide along the vertical direction of FIG. 1, and is normally kept in its lowermost position as shown in FIG. 1 by a tension spring 48. The fast forward control lever 47 has a cam pin 49 and a stopper pin 50 on the top thereof. The cam surface 33 of the head mounting plate 29 is pressed against the cam pin 49 by the elastic force of the spring 32 to regulate the position of the magnetic head 30. When the control lever 47 is pushed in the upward direction of FIG. 1 against the urging force of the spring 48, the cam pin 49 slides along the cam surface 33 to push back the head mounting plate 29, thereby causing the magnetic head 30 to retreat to the right of FIG. 1. Between the fast forward control lever 47 and the transmission member 35, moreover, a hook 51 made of a leaf spring is rockably mounted on the top of the base plate 1 by means of a pivot 52. As shown in FIG. 6, the hook 51 is normally pressed against the upper surface of the base plate 1 and urged to rock in the clockwise direction by a coil spring 53 wound round the pivot 52, having its right side edge abutting on the stopper pin 50 of the fast forward control lever 47. The hook 51 has on its right side edge a stopper recess 54 for holding the fast forward control lever 47 in its retreated position, a cam-shaped projection 55 in front of the recess 54, and release strips 56 and 57 obliquely raised in positions respectively on the left of the recess 54 and on the right of the cam-shaped projection 55. Further, the hook 51 has a V-shaped release cam 58 projected downward on its left side edge. The release cam 58 is located on the path of the projection 39 of the transmission member 35 so that it may slide on the projection 39 to bend the whole body of the hook 51 upward when the transmission member 35 moves in either direction. When the hook 51 is bent upward while the stopper pin 50 is held inside the stopper recess 54 as represented by an imaginary line in FIG. 6, the stopper recess 54 is released from the stopper pin 50 to allow the fast forward control lever 47 to return to its original position by the action of the spring 48.

Now the operation of the tape recorder will be described. First, in a stop mode, the mounting plate 29 is held in a rightward position of the drawings by a certain mechanism (not shown). When a tape cassette (not shown) is set on the reel shafts 2A and 2B and the tape recorder is operated in a playback or recording mode, the motor 14 rotates in either direction (e.g. counter-clockwise direction as shown in FIG. 1), the head mounting plate 29 moves to the left to bring the magnetic head 30 in contact with a magnetic tape in the cassette, and the pinch roller 17A is pressed against the capstan 3A. Then, the capstans 3A and 3B and the driving rotator 5 are driven by the rotation of the motor 14, and the reel shaft 2A is driven to rotate with the aid of the intermediate gear 10. Thus, the magnetic tape in the cassette is fed at a controlled speed and is wound round a take-up reel set on the reel shaft 2A. In the meantime, the desired playback or recording operation is performed.

When the tape in the cassette is drawn out to its end in this way, the tape end is detected by a special means, and thus the rotating direction of the motor 14 is changed. As the means for detecting the tape end to switch the rotating direction of the motor, there may be used various kinds of systems including mechanical ones which detect a sudden change of tape tension to operate a reversing switch of the motor, as well as electrical ones which electrically detect a conductive foil attached to the tape end portion to reverse the motor.

Figure 2:
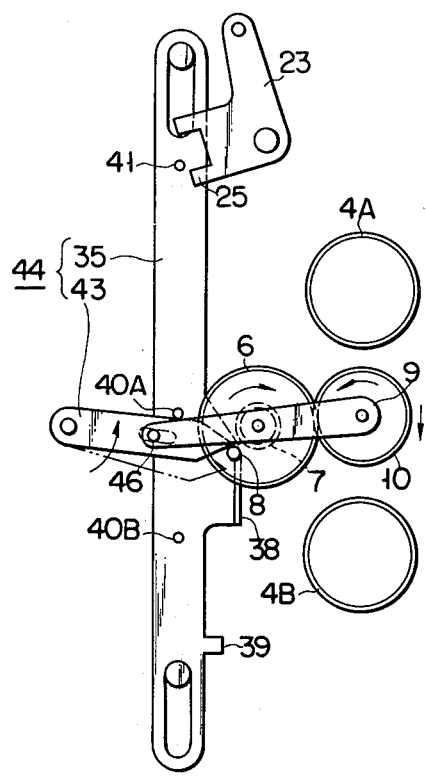
Figure 3:
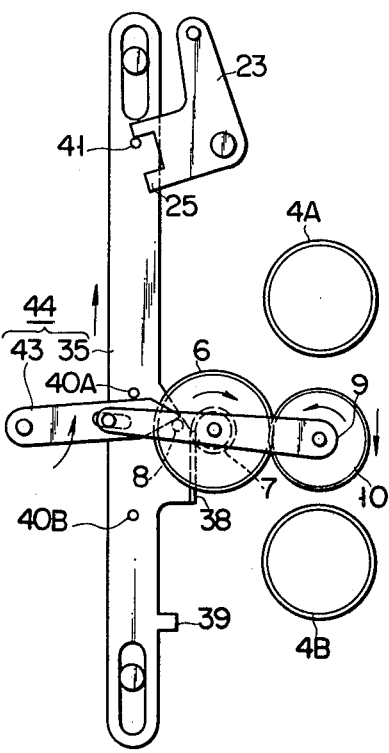

When the rotating direction of the motor 14 is changed, the rotating directions of the driving rotator 5 and the capstans 3A and 3B are also changed, so that the rocking member 9 rocks in the same direction (clockwise direction) as the driving rotator 5 as shown in FIG. 2, thereby removing the intermediate gear 10 from the working gear 4A. By the rocking force of the rocking member 9, moreover, the engaging member 43 is driven in the counterclockwise direction. In this case, although the rocking force of the rocking member 9 is very small, it is great enough to rock the engaging member 43 since the engaging member 43 is initially subject to no special load. When the rocking end of the engaging member 43 comes to be located on the revolution orbit of the pin 8 on the large gear 6, as shown in FIG. 2, the pin 8 causes the engaging member 43 to rock powerfully in the counterclockwise direction by means of the strong turning force of the driving rotator 5. As a result, the engaging member 43 presses the engaging pin 40A of the transmission member 35 to move the transmission member 35 in the direction of the arrow in FIG. 3, thereby causing the rack 38 of the member 35 to engage the small gear 7. Thereafter, although the engaging member 43 slips off the revolution orbit of the pin 8, the transmission member 35 further moves in the same direction through the engagement between the small gear 7 and the rack 38. Thus, the transmission member 35 presses the engaging portion 25 of the rocking lever 23 by its operating pin 41 to rock the lever 23 in the clockwise direction, and is stably maintained in its uppermost position as shown in FIG. 4 by the toggle spring 42. Further, the intermediate gear 10 engages the other working gear 4B to transmit the turning force of the driving rotator 5 to the reel shaft 2B. On the other hand, the rocking force of the rocking lever 23 is transmitted to the shift lever 21 via the coupling lever 24. The movement of the coupling lever 24 shifts the switch 34 to change the polarity of the magnetic head 30. At the same time, the pinch roller 17A is separated from the capstan 3A, and the other pinch roller 17B is pressed against the capstan 3B with the magnetic tape therebetween. Thus, the magnetic tape in the cassette is driven by the capstan 3B to run in the opposite direction, and is wound round a reel set on the reel shaft 2B for playback or recording operation. When the magnetic tape is drawn out of the reel on the reel shaft 2A to its end, the tape feed direction is changed in the same manner as aforesaid, and the playback or recording operation is continued.

Figure 5:
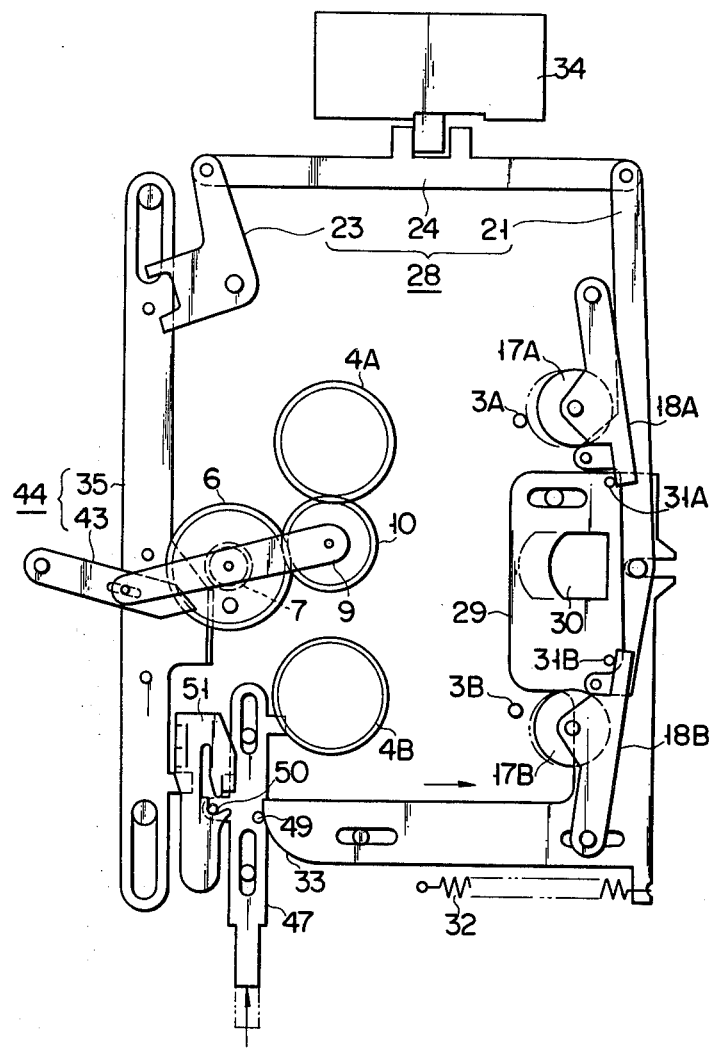

Subsequently, when the fast forward control lever 47 is pushed in as shown in FIG. 5 to cause the stopper pin 50 to be seized by the stopper recess 54 of the hook 51 while the motor 14 is rotating counterclockwise as shown in FIG. 1 for playback or recording operation, for example, the cam pin 49 on the lever 47 presses the cam surface 33 of the head mounting plate 29 to push back the mounting plate 29 to the right against the urging force of the spring 32. Then, the magnetic head 30 mounted on the mounting plate 29 is separated from the magnetic tape in the cassette, and the pinch arms 18A and 18B are pushed back by the pressure pins 31A and 31B on the mounting plate 29 to separate the pinch rollers 17A and 17B from their corresponding capstans 3A and 3B. Thus released from the restraint of the capstan 3A, the magnetic tape is wound up at a high speed by the rotation of the reel shaft 2A.

When the magnetic tape is entirely wound round the one reel, the rotating direction of the motor 14 is changed in the aforesaid manner, and the rocking member 9 rocks. Further, the intermediate gear 10 is separated from the one working gear 4A and caused to engage the other working gear 4B, and the turning force of the driving rotator 5 is transmitted to the transmission member 35 through the engaging member 43 to slide the transmission member 35. Then, the pinch roller shift mechanism 28 is actuated by the slide of the transmission member 35. At this time, the projection 39 of the transmission member 35 slides on the release cam 58 of the hook 51 to bend the hook 51 upward, so that the stopper pin 50 is removed from the hook 51, and the fast forward control lever 47 is restored to its initial position by the spring 48. Then, the head mounting plate 29 is also restored to its initial position by the spring 32 to bring the magnetic head 30 in contact with the magnetic tape and to press the pinch roller 17B against the capstan 3B. Thus, the state of FIG. 4 is reproduced, and the magnetic tape runs at a speed restrained by the capstan 3B and is wound round the reel on the reel shaft 2B for playback or recording operation.

The auto-reverse device according to the above-mentioned embodiment changes the rotating direction of the driving rotator 5 and rocks the rocking member 9 in response to the change of the rotating direction of the motor 14. By the small rocking force of the rocking member 9, transmission member 44 (engaging member 43) is first moved to a position where it engages the engaging pin 8 on the driving rotator 5. By the turning force of the driving rotator 5, the transmission mechanism 44 is positively driven to actuate the pinch roller shift mechanisnmm 28, thereby shifting the positions of the pinch rollers 17A and 17B relative to the capstans 3A and 3B. Thus, the pinch rollers 17A and 17B can be shifted by utilizing the turning force of the motor 14 to drive the capstans 3A and 3B, so that the auto-reverse device may be simplified in construction. Requiring no electromagnetic plunger, unlike the prior art devices, the device of the invention is power-saving and conducive to miniaturization of the tape recorder.

Referring now to FIGS. 7 and 8, there will be described another embodiment of the invention. In this embodiment, an arcuate tooth portion 59A to engage a large gear 6 of a driving rotator 5 is formed on the rocking end of an engaging member 59 so that a transmission mechanism 60 is formed of the engaging member 59 and a transmission member 35, and the engaging pin 8 of the large gear 6 is omitted (like reference numerals are used to designate the same portions included in the foregoing embodiment).

Also with such arrangement, the engaging member 59 can be first rocked by the rocking force of a rocking member 9 to a position where the engaging member 59 engages the large gear 6, as shown in FIG. 7, and then the engaging member 53 can be rotated strongly by the turning force of the large gear 6 so that the transmission member 35 may be moved in the direction of the arrow of FIG. 8 to a position to engage a small gear 7 by means of the engaging member 59. Thus, the same effect of the foregoing embodiment may be obtained.

Figure 9:
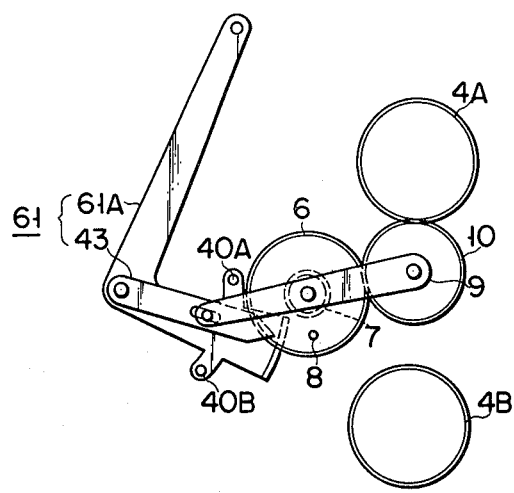

FIG. 9 shows still another embodiment of the invention, in which the same effect of the embodiment of FIGS. 1 to 6 is obtained with use of a transmission mechanism 61 formed of a rocking transmission member 61A and an engaging member 43.

Figure 10:
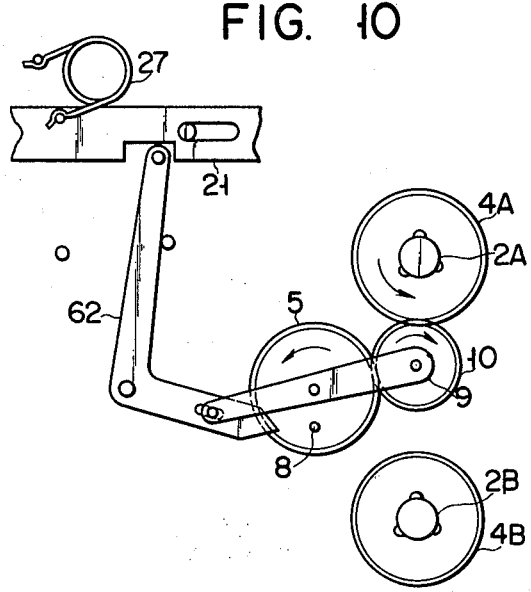

FIG. 10 shows a further embodiment using a simplified transmission mechanism 62 as a single member in place of the combination of the transmission member 35 and the engaging member 43 used in the embodiment of FIGS. 1 to 6. Also in this case, the transmission mechanism 62 is moved onto the revolution orbit of an engaging pin 8 on a driving rotator 5 by the rocking action of a rocking member 9 to receive the turning force of the driving rotator 5, thereby driving a pinch roller shift mechanism 28. Thus, the same effect of the foregoing embodiments may be obtained.

In an embodiment shown in FIG. 11, a first driving rotator 5 drives an itermediate rotator (intermediate gear 10) only, and a transmission gear 11 as a second driving rotator drives an engaging member 63 to actuate a pinch roller shift mechanism (not shown) through a transmission member 64. The engaging member 63 and the transmission member 64 constitute a transmission mechanism 65, and the transmission member 64 is coupled with the pinch roller shift mechanism. Namely, FIG. 11 shows a state in which the first driving rotator 5 rotates in the counterclockwise direction, and a rocking member 66 is urged in the same direction to cause the intermediate gear 10 to engage one working gear 4A so that the turning force of the first driving rotator 5 is transmitted to one reel shaft 2A. In this state, a pinch roller on the same side with the reel shaft 2A is pressed against its corresponding capstan for specified playback or recording operation. When the tape is drawn out to its end and the rotating direction of the motor is changed, the rotating directions of the first driving rotator 5 and the second driving rotator or transmission gear 11 engaging the first driving rotator 5 are changed. Then, the rocking member 66 rocks in the same direction as the first rotator 5 to cause the intermediate gear 10 to engage the other working gear 4B. Since the engaging member 63 is coupled to the rocking member 66 through the engagement between a pin 66A and a slot 63A, the engaging member 63 slightly rocks round a pivot 63B accompanying the clockwise rocking action of the rocking member 66, thereby locating its one end on the revolution orbit of an engaging pin 67 formed on the transmission gear 11. Then, the engaging pin 67 abuts on the one end of the engaging member 63, and the engaging member 63 is rocked strongly by the turning force of the transmission gear 11 so that the engaging pin 64A on the transmission member 64 is pressed by the other end of the engaging member 63 to move the transmission member 64 in the upward direction of FIG. 11. As a result, a rack 64B on one side of the transmission member 64 is caused to engage the first driving rotator 5. Hereupon, the transmission member 64 is driven further upward by a large gear 6 of the driving rotator 5 so that the pinch roller shift mechanism is driven through the transmission member 64. Further, one pitch roller is separated from its corresponding capstan, while the other pinch roller is pressed against its corresponding capstan to change the tape feed direction.

In an embodiment shown in FIG. 12, an intermediate rotator (intermediate gear 10) is driven by a first driving rotator 5, and a pinch roller shift mechanism 68 is driven by a second driving rotator (transmission gear 11) and a third driving rotator (small gear 70 mounted on one capstan 3A) through a transmission mechanism 69. The transmission mechanism 69 is formed of an engaging member 71 and a transmission member 72. Namely, FIG. 12 shows a state in which the first driving rotator 5 rotates in the counterclockwise direction, and a rocking member 73 is urged in the same direction to cause the intermediate gear 10 mounted on one side thereof to engage one working gear 4A, thereby transmitting the turning force of the first driving rotator 5 to one reel shaft 2A and pressing a pinch roller 17A against a capstan 3A on the same side. In this state, the capstan 3A also rotates together with the small gear 70 as the third driving rotator in the counterclockwise direction, and the tape is fed by the capstan 3A and the pinch roller 17A for specified playback or recording operation. When the tape is drawn out to its end and the rotating direction of the motor is changed, the rotating directions of the first driving rotator 5, transmission gear 11, and small gear 70 are also changed. Then, the rocking member 73 rocks in the same direction as the first driving rotator 5 to cause the intermediate gear 10 to engage the other working gear 4B. When the rocking member 73 is rocked slightly in the clockwise direction, the other end of the rocking member 73 is located on the revolution orbit of a pin 74 formed on the transmission gear 11, and a projection 73A on the other end of the rocking member 73 is caused to abut on or approach one projection 71A out of a pair of projections 71A and 71B formed on one end of the engaging member 71. Then, the pin 74 abuts on the other end of the rocking member 73, and the turning force of the transmission gear 11 is transmitted through the projections 73A and 71A to the engaging member 71 to rock the engaging member 71 in the counterclockwise direction of FIG. 12. While rocking, the engaging member 71 presses by the other end thereof an engaging pin 72A formed on the transmission member 72 to move the transmission member 72 upward, thereby causing a rack 72B formed on one side of the transmission member 72 to engage the small gear 70. Then, the transmission member 72 is driven further upward by the small gear 70. At the same time, the pinch roller shift mechanism 68 is pressed by a projection 72C formed on one end of the transmission member 72 to rock round a pivot 68A. Thus, the one pinch roller 17A is separated from the capstan 3A, while the other pinch roller 17B is pressed against its corresponding capstan 3B.

Figure 13:
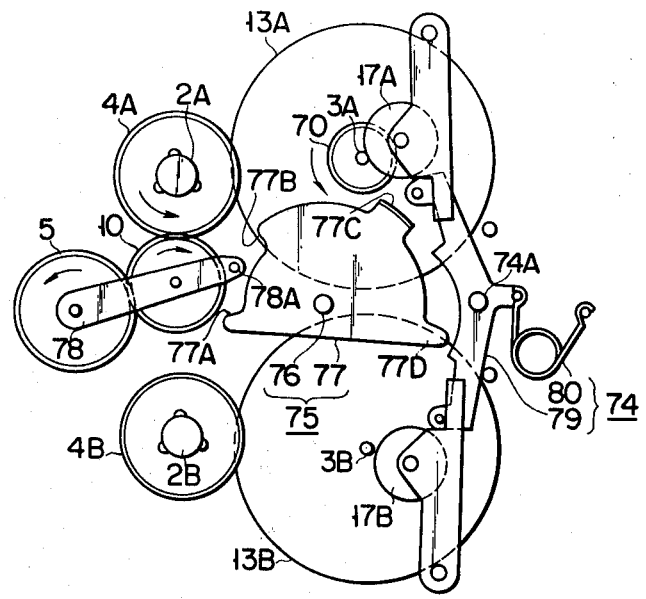

In an embodiment shown in FIG. 13, an intermediate rotator (intermediate gear 10) is driven by a first driving rotator 5, and a pinch roller shift mechanism 74 is driven by only a small gear 70 as a third driving rotator with the aid of a transmission mechanism 75. The transmission mechanism 75 is formed of a pivot 76 fixed on a base plate and a plate-like transmission member 77 rockably mounted on the pivot 76. On the peripheral edge of the transmission member 77, there are formed a pair of abutting members 77A and 77B facing each other, an arcuate tooth portion 77C to engage the small gear 70, and a presser portion 77D. An engaging pin 78A is fixed to the rocking end portion of a rocking member 78 which is rockably mounted on the same axis with the first driving rotator 5. Further, the pinch roller shift mechanism 74 is so designed that a shift lever 79 rockable round a pivot 74A may be maintained in a stable position on the left or right by means of a toggle spring 80, and that one of pinch rollers 17A and 17B may be kept apart from its corresponding capstan 3A or 3B by the shift lever 79. When the transmission member 77 rocks, the shift lever 79 is pressed by the presser portion 77D of the member 77 to rock, thereby separating the one pinch roller from its corresponding capstan and pressing the other pinch roller against its corresponding capstan.

Accordingly, in a state where the first driving rotator 5 rotates in the counterclockwise direction so that the turning force of the driving rotator 5 may be transmitted to one working gear 4A, as shown in FIG. 13, when the rotating direction of a motor is changed, the rocking member 78 rocks together with the first driving rotator 5 in the clockwise direction to cause the intermediate gear 10 to engage the other working gear 4B. At this time, the engaging pin 78A of the rocking member 78 presses the abutting portion 77A of the transmission member 77 to rock the member 77, thereby causing the tooth portion 77C to engage the small gear 70. Receiving the turning force of the small gear 70, the transmission member 77 rocks strongly in the counterclockwise direction to actuate the pinch roller shift mechanism 74 for shifting operation.

Figure 14:
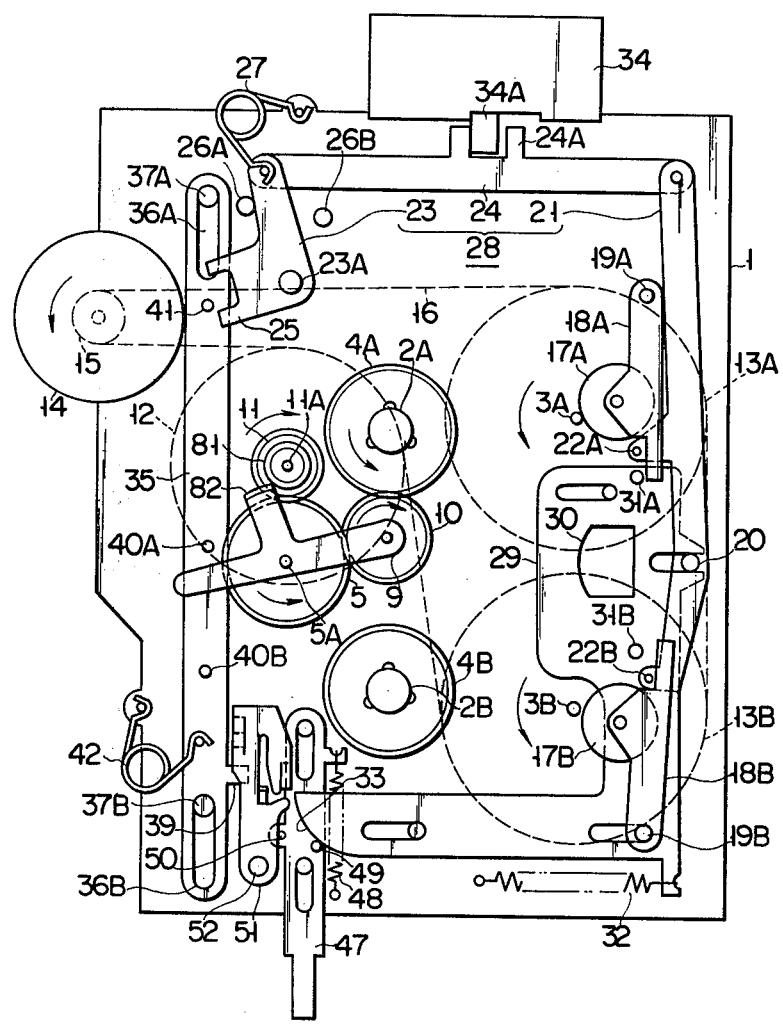
Figure 15:
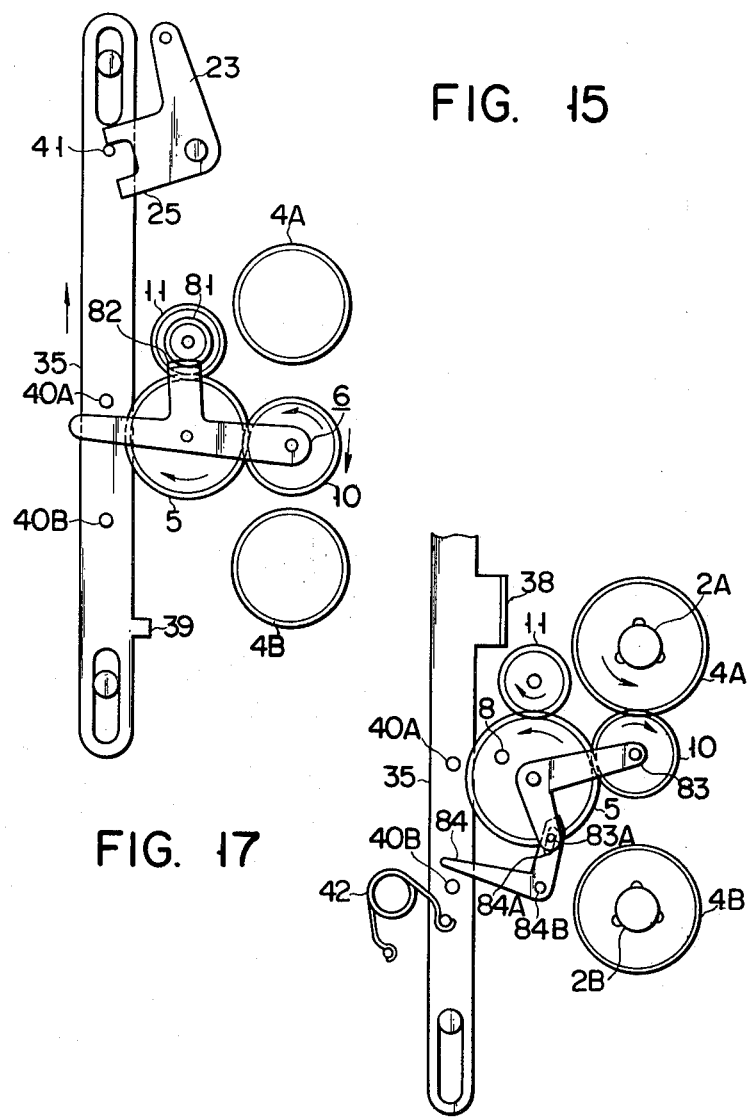
Figure 16:
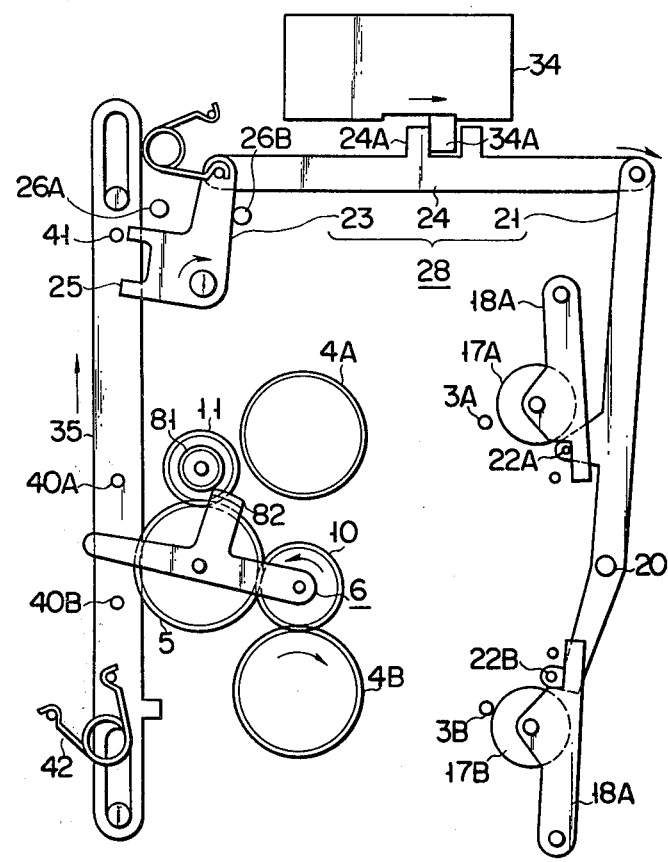

Now there will be described a further embodiment shown in FIGS. 14 to 16. This embodimemt is provided with a small gear 81 integral with a transmission gear 11 and a rack portion 82 on a rocking member 9. When the rotating direction of a driving rotator 5 is changed to rock the rocking member 9 slightly, the rack portion 80 comes to engage the small gear 81, as shown in FIG. 15. Then, the rocking member 9 is rocked further strongly by the turning force of the transmission gear 11 to press an engaging pin 40A or 40B protruding from a transmission member 35. Thus, the transmission member 35 is operated in the same manner as in the first embodiment to actuate a pinch roller shift mechanism 28 for shifting operation, as shown in FIG. 16.

FIG. 17 shows an alternative embodiment in state where a driving rotator 5 rotate in the counterclockwise direction, and a rocking member 83 is urged in the same direction to cause an intermediate gear 10 to engage one working gear 4A, thereby transmitting the turning force of the driving rotator 5 to one reel shaft 2A. In this state, a pinch roller on the same side with the reel shaft 2A is pressed against its corresponding capstan for specified playback or recording operation. When the tape is drawn out to its end and the rotating direction of the motor is changed, the rotating directions of the driving rotator 5 and a transmission gear 11 engaging the same are also changed. Then, the rocking member 83 rocks in the same direction as the driving rotator 5 to cause the intermediate gear 10 to engage the other working gear 4B. Since an engaging member 84 is coupled to the rocking member 83 by means of the engagement between a pin 83A and a slot 84A, the engaging member 84 rocks slightly round a pivot 84B as the rocking member 83 rocks, and one end of the engaging member 84 comes to be located on the revolution orbit of an engaging pin 8 on the driving rotator 5. Thus, the engaging pin 8 abuts on the one end of the engaging member 84 so that the engaging member 84 is rocked strongly by the turning force of the driving rotator 5. As a result, the other end of the engaging member 84 presses an engaging pin 40A formed on a transmission member 35 to move the transmission member 35 in the downward direction of FIG. 17, thereby causing a rack 38 formed on one side of the transmission member 35 to engage the transmission gear 11. Then, the transmission member 35 is driven further downward by the transmission gear 11, and a pinch roller shaft mechanism is actuated to separate one pinch roller from its corresponding capstan and to press the other pinch roller against its corresponding capstan, thereby changing the tape feed direction. When the rotating direction of the motor is further changed, the engaging member 84 presses the engaging pin 40A of the transmission member 35 to actuate the pinch roller shift mechanism.

Figure 18:
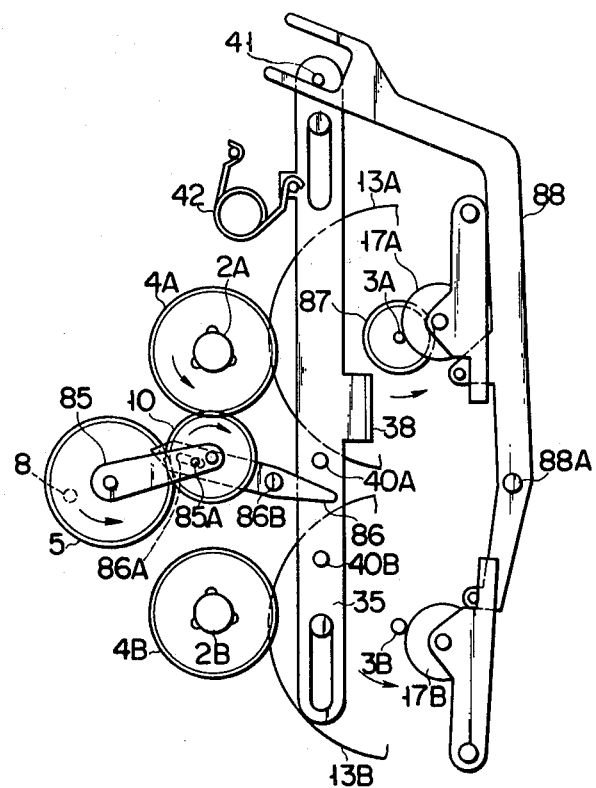

FIG. 18 shows a further alternative embodiment in a state where a driving rotator 5 rotates in the counterclockwise direction, and a rocking member 85 is urged in the same direction to cause an intermediate gear 10 to engage one working gear 4A, thereby transmitting the turning force of the driving rotator 5 to one reel shaft 2A. In this state, a pinch roller 17A on the same side with the reel shaft 2A is pressed against a capstan 3A for specified playback or recording operation. When the tape is drawn out to its end and the rotating direction of the motor is changed, the rotating directions of the driving rotator 5 and the capstan 3A are also changed. Then, the rocking member 85 rocks in the same direction as the driving rotator 5 to cause the intermediate gear 10 to engage the other working gear 4B. Since an engaging member 86 is coupled to the rocking member 85 by means of the engagement between a pin 85A and a slot 86A, the engaging member 86 rocks slightly round a pivot 86B as the rocking member 85 rocks, and one end of the engaging member 86 comes to be located on the revolution orbit of an engaging pin 8 on the driving rotator 5. Thus, the engaging pin 8 abuts on the one end of the engaging member 86 so that the engaging member 86 is rocked strongly by the turning force of the driving rotator 5. As a result, the other end of the engaging member 86 presses an engaging pin 40A formed on a transmission member 35 to move the transmission member 35 in the upward direction of FIG. 18, thereby causing a rack 38 formed on one side of the transmission member 35 to engage a small gear 87 which is mounted on the capstan 3A. Then, the transmission member 35 is driven further upward by the small gear 87. At the same time, an operating pin 41 formed on the transmission member 35 presses a shift lever 88 as a pinch roller shift mechanism to rock the shift lever 88 round a pivot 88A, thereby separating the one pinch roller 17A from the capstan 3A and pressing the other pinch roller 17B against its corresponding capstan 3B.

What is claimed is:

1. An auto-reverse device for a two-reel type tape recorder comprising:
    a pair of reel shafts each provided with a working rotator to respectively rotate together therewith;
    a magnetic head;
    a pair of capstans disposed on both sides of said magnetic head respectively;
    a pair of pinch rollers disposed correspondingly to said capstans and being arranged to be alternately pressed against their corresponding capstans;
    a reversible motor for driving said capstans to rotate;
    a pinch roller shift mechanism coupled to said pinch rollers for shifting the positions of said pinch rollers relative to said capstans in synchronism with a change of the rotating direction of said motor;
    a driving rotator driven by said motor;
    an intermediate rotator engaging said driving rotator and selectively engaging one of said working rotators in an alternative way to transmit the turning force of said driving rotator to the engaged one of said working rotators;
    a rocking member mounted coaxially with said driving rotator, urged in the same direction as the rotating direction of said driving rotator by the turning force of said driving rotator, and being rockable in synchronism with a change of the rotating direction of said motor, thereby separating said intermediate rotator from one of said working rotators and causing said intermediate rotator to engage the other of said working rotators; and
    a transmission mechanism coupled to said pinch roller shift mechanism receiving the turning force of said motor in response to the rocking action of said rocking member, for thereby actuating said pinch roller shift mechanism to shift the position of said pinch rollers.

2. An auto-reverse device for a two-reel type tape recorder comprising:
    a pair of reel shafts each provided with a working rotator to respectively rotate together therewith;
    a magnetic head; a pair of capstans disposed on both sides of said magnetic head respectively;
    a pair of pinch rollers disposed correspondingly to said capstans and being arranged to be alternately pressed against their corresponding capstans;
    a reversible motor for driving said capstans to rotate;
    a pinch roller shift mechanism coupled to said pinch rollers for shifting the positions of said pinch rollers relative to said capstans in synchronism with a change of the rotating direction of said motor;
    a driving rotator driven by said motor;
    an intermediate rotator engaging said driving rotator and selectively engaging one of said working rotators in an alternative way to transmit the turning force of said driving rotator to the engaged one of said working rotators;
    a rocking member mounted coaxially with said driving rotator, urged in the same direction as the rotating direction of said driving rotator by the turning force of said driving rotator, and being rockable in synchronism with a change of the rotating direction of said motor, thereby separating said intermediate rotator from one of said working rotators and causing said intermediate rotator to engage the other of said working rotators; and
    a transmission mechanism normally disengaged from said driving rotator and being movable to a position to engage said driving rotator responsive to the rocking force of said rocking member to transmit the turning force of said driving rotator to said pinch roller shift mechanism, thereby actuating said pinch roller shift mechanism to shift the positions of said pinch rollers relative to their corresponding capstans.

3. An auto-reverse device for a two-reel type tape recorder according to claim 2, wherein said transmission mechanism includes an engaging member normally disengaged from said driving rotator and being movable to a position to engage an engaging portion of said driving rotator responsive to the rocking force of said rocking member, and a transmission member movable to a position to engage said driving rotator in gear with said engaging member as said engaging member engages said engaging portion and receiving the turning force of said driving rotator so as to be displaced by a given distance and then driven by said driving rotator to actuate said pinch roller shift mechanism, thereby shifting the positions of said pinch rollers relative to their corresponding capstans.

4. An auto-reverse device for a two-reel type tape recorder according to any one of claims 1, 2 or 3, wherein said working rotators, driving rotator, and intermediate rotator are gears.

5. An auto-reverse device for a two-reel type tape recorder comprising:
    a pair of reel shafts each provided with a working rotator to rotate together therewith;
    a magnetic head;
    a pair of capstans disposed on both sides of said magnetic head respectively;
    a pair of pinch rollers disposed correspondingly to said capstans and arranged to be alternately pressed against their corresponding capstans;
    a self-returning fast forward control member retreating said magnetic head and pinch rollers when said control member is pushed in or retreated and restoring said magnetic head and pinch rollers by its returning action;
    a stopper member for holding said fast forward control member in its retreated position;
    a reversible motor for driving said capstans to rotate;
    a pinch roller shift mechanism for shifting the positions of said pinch rollers relative to said capstans in synchronism with a change of the rotating direction of said motor;

a driving rotator driven by said motor;

an intermediate rotator engaging said driving rotator and selectively engaging one of said working rotators in an alternatively way to transmit the turning force of said driving rotator to said working rotator;

a rocking member mounted coaxially with said driving rotator, urged in the same direction as the rotating direction of said driving rotator by the turning force of said driving rotator, and rocking in synchronism with the change of the rotating direction of said motor, thereby separating said intermediate rotator from said one working rotator and causing said intermediate rotator to engage the other working rotator; and a transmission mechanism receiving the turning force of said motor in response to the rocking action of said rocking member, thereby actuating said pinch roller shift mechanism so that said fast forward control member is removed from said stopper member when said fast forward control member is held in its retreated position by said stopper member.

6. An auto-reverse device for a two-reel type tape recorder according to claim 5, wherein said working rotators, driving rotator, and intermediate rotator are gears.

* * * * *